US012711510B2

(12) United States Patent
Misra et al.

(10) Patent No.: US 12,711,510 B2
(45) Date of Patent: Aug. 18, 2026

(54) ONLINE TRANSACTIONAL BEHAVIOR THROUGH DECOY BLOCKCHAIN AND SMARTDUST SENSING PAIRED WITH DCNN

(71) Applicant: Bank of America Corporation, Charlotte, NC (US)

(72) Inventors: Yash Misra, Lucknow (IN); Nimish Ravindra Deshpande, Mumbai (IN); Amit Chauhan, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 18 days.

(21) Appl. No.: 18/738,272

(22) Filed: Jun. 10, 2024

(65) Prior Publication Data

US 2025/0378443 A1 Dec. 11, 2025

(51) Int. Cl.
*G06Q 20/40* (2012.01)

(52) U.S. Cl.
CPC ..... *G06Q 20/4016* (2013.01); *G06Q 20/4018* (2013.01)

(58) Field of Classification Search
CPC ............................................. G06Q 20/00–425
See application file for complete search history.

(56) References Cited

U.S. PATENT DOCUMENTS 8,851,366 B2 10/2014 Modi
10,346,837 B2 7/2019 Steele et al.
10,757,137 B1 * 8/2020 Roturier ................ G06N 20/00
10,887,447 B2 1/2021 Jakobsson et al.
11,121,881 B2 9/2021 Handa et al.
11,170,395 B2 11/2021 Pavletic et al.
11,354,666 B1 * 6/2022 Ketharaju ............ H04L 63/102
11,436,615 B2 9/2022 Fang et al.
11,764,959 B1 9/2023 Dods et al.
11,847,572 B2 12/2023 Zhao et al.
11,991,183 B2 5/2024 Zhang
2019/0295087 A1 9/2019 Jia et al.
2020/0104810 A1 * 4/2020 Mallampalli ...... G06Q 20/4012
(Continued)

FOREIGN PATENT DOCUMENTS

CN 111985924 A 11/2020
CN 106104603 B 2/2021
WO 2008018052 A2 2/2008

OTHER PUBLICATIONS

Imad et al., "Smart Dust: Sensor Network Applications, Architecture, and Design," published by Taylor & Francis Group, 2006 (Year : 2006).*

*Primary Examiner* — Chenyuh Kuo
(74) *Attorney, Agent, or Firm* — Banner & Witcoff, Ltd.

(57) ABSTRACT

The present disclosure provides a security method, a computing platform, and a system for enhanced online transaction security. The method includes receiving transactional information from a user, and distributing the transactional information over a sensor network of the computing platform. The method also includes generating a decoy transactional block that imitates the transactional information within a blockchain network of the computing platform. The method further includes displaying an association page for the user to enter a verification code and deleting the decoy transactional block from the blockchain network based on determining that the transactional information is authentic.

17 Claims, 8 Drawing Sheets

(56) References Cited

U.S. PATENT DOCUMENTS

| | | | | |
|---|---|---|---|---|
| 2020/0220887 | A1* | 7/2020 | A.K. | H04L 67/12 |
| 2021/0287225 | A1 | 9/2021 | He | |
| 2021/0390465 | A1 | 12/2021 | Werder et al. | |
| 2022/0103584 | A1* | 3/2022 | Tobin | H04L 63/0236 |
| 2022/0215465 | A1 | 7/2022 | Mitchko et al. | |
| 2022/0261875 | A1* | 8/2022 | Vashisht | G06N 3/08 |
| 2022/0284435 | A1 | 9/2022 | Zhao et al. | |
| 2022/0391912 | A1 | 12/2022 | Kim et al. | |
| 2023/0092462 | A1 | 3/2023 | Das et al. | |
| 2024/0020660 | A1 | 1/2024 | Wasserman | |
| 2024/0303624 | A1* | 9/2024 | Trummer | G06Q 20/3223 |

* cited by examiner

ONLINE TRANSACTIONAL BEHAVIOR THROUGH DECOY BLOCKCHAIN AND SMARTDUST SENSING PAIRED WITH DCNN

TECHNICAL FIELD

Generally, the present disclosure relates to a security method, a computing platform, and a system. More particularly, the disclosure relates to online transaction security.

BACKGROUND

Online transactions are an increasingly popular electronic payment method and provide essential support for e-commerce business. Various verification methods, such as password, one-time password (OTP), multi-factor authentication, and/or blockchain or distributed ledger are used in order to safeguard the online transaction. For example, once a customer is authenticated, an electronic payment is processed, and accordingly, an online transaction is completed. However, for such a transaction type where a debit or credit card is not present (card not present (CNP)), or a debit or credit card is present but not physically used, risks of fraud arise. Customer credentials may be stolen, which causes unauthorized use of debit or credit cards for online transactions, including mail order and phone order transactions. Currently, all these verification methods do not provide preventive measures to fend off the unauthorized use of debit or credit cards. Banks will not be notified of fraud until users of debit or credit cards notice it and notify the banks.

Examples described herein provide a smart controlled mechanism capable of identifying CNP based transactional behavior and ceasing unauthorized use of debit or credit cards before it succeeds.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

In some examples, the present disclosure provides a method for a secure online transaction. The method may include receiving transactional information from a user, distributing the transactional information over a sensor network of the computing platform, generating a decoy transactional block that imitates the transactional information within a blockchain network of the computing platform, and displaying an association page for the user to enter a verification code and deleting the decoy transactional block from the blockchain network based on determining that the transactional information is authentic.

In some examples, the method may further include initiating a communication among one or more sensors of the sensor network of the computing platform, and relaying the transactional information among the one or more sensors of the sensor network of the computing platform.

In some examples, the one or more sensors of the sensor network of the computing platform may be based on a nanoelectromechanical system (NEMS).

In some examples, the transactional information may include a credit card or a debit card of the user, a card verification value (CVV) for the credit card or the debit card, a name of the user, a date and time of a transaction, a location of the transaction, an internet protocol (IP) address of a device used by the user for the transaction, an amount of the transaction, a frequency of use of the credit card or the debit card, a voltage of computation power that is utilized by the device for the user to enter the transactional information, and a current and power consumption that is utilized by the device for the user to enter the transactional information.

In some examples, the method may further include obtaining historical transactional data of the user from a bank network that matches the transactional information, and infusing the transactional information and the historical transactional data of the user with an algorithm to determine whether the transactional information is authentic.

In some examples, the algorithm may be a deep convolutional neural network (DCNN) algorithm.

In some examples, the method may further include generating a matrix of validation nodes within the blockchain network of the computing platform that are filled with decoy transactional values.

In some examples, the present disclosure may provide a computing platform. The computing platform may include at least one processor, a communication interface communicatively coupled to the at least one processor, and memory storing computer-readable instructions that, when executed by the at least one processor, cause the computing platform to receive transactional information from a user, distribute the transactional information over a sensor network of the computing platform, generate a decoy transactional block that imitates the transactional information within a blockchain network of the computing platform, and display an association page for the user to enter a verification code and delete the decoy transactional block from the blockchain network based on determining that the transactional information is authentic.

In some examples, the present disclosure may provide a non-transitory computer-readable medium, having computer-executable instructions stored thereon, the computer-executable instructions, when executed by one or more processors of a computing platform, cause the computing platform to facilitate receiving transactional information from a user, distributing the transactional information over a sensor network of the computing platform, generating a decoy transactional block that imitates the transactional information within a blockchain network of the computing platform, and displaying an association page for the user to enter a verification code and deleting the decoy transactional block from the blockchain network based on determining that the transactional information is authentic.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
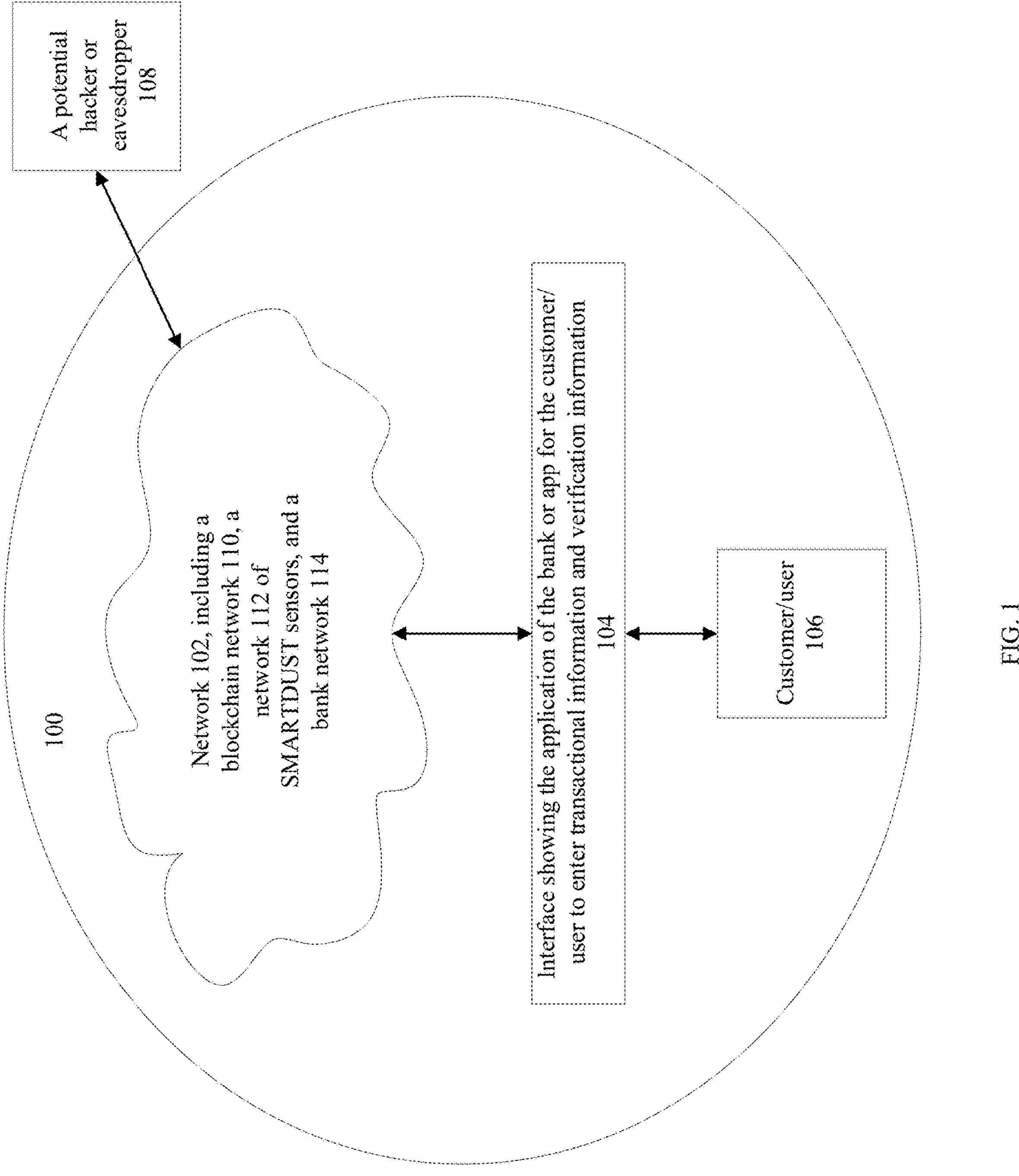
FIG. 1 illustrates an example of an overview of devices and systems for executing an online transaction according to some examples of the present disclosure.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The present disclosure provides a smart controlled mechanism that enhances online transaction security. The mechanism may use a combination of a blockchain network and a network of smartdust sensors. In some examples, the arrangements may further pair the network of smartdust sensors with a deep convolutional neural network (DCNN) for more accurately identifying a customer's online transactional behavior. As such, unauthorized use of debit or credit cards is prevented before a potential hacker or eavesdropper is able to enter verification information through an association webpage.

Some examples described herein relate to a system for a secure online transaction. The system may include a blockchain network, a network of smartdust sensors, a bank network, and an interface. One smartdust sensor may receive all transactional details of a user. These transactional details may be then transmitted among smartdust sensors of the smartdust sensor network based on each single transactional detail. Simultaneously, decoy transactional information may be created as a decoy block within the blockchain network to make sure a hacker or an eavesdropper would not be able to reach the real transactional details. Within the network of smartdust sensors, the real transactional details may be compared with the user's historical transactional data to determine authenticity of the transaction. Once the transaction is determined to be authentic, the user may be able to finalize the transaction by entering verification information via the interface. In addition, the decoy transactional information might not be recorded to the blockchain network.

Some examples described herein relate to a computing platform for a secure online transaction. The computing platform may include at least one processor and memory that is coupled to the at least one processor and stores computer-readable instructions. The computing platform may receive the transactional details from a user via the interface. The computing platform may relay the transactional details within the smartdust sensor network. The computing platform may generate a decoy transactional block that imitates the transactional details, and also a real blockchain environment of its blockchain network. The computing platform may display an association page via the interface to the user so that the user may be able to enter a verification code to complete the transaction. Further, the computing platform might not record the decoy transactional block to its blockchain network.

Some examples described herein relate to a method for a secure online transaction. The method may include receiving the transactional details from a user. The method may include traversing the transactional details among nodes of the smartdust sensor network to create one or more validation nodes, also known as MOTEs. The method may also include creating a decoy transactional decoy block in a real blockchain environment based on the transactional details. The method may further include verifying the user's transactional details with the support of the MOTEs and loading an association page to the user.

Some examples described herein relate to a method for a secure online transaction, which may include the nodes of the smartdust sensor network communicating with each other and relaying the transactional details among themselves. As such, the smartdust sensor network may verify the transaction based on each of the transactional details.

Some examples described herein relate to a method for a secure online transaction, which may include a decoy block generating a matrix of validation nodes that are filled with decoy transactional values within the blockchain network. With the matrix of falsified transactional values, a hacker or an eavesdropper cannot reach the real transactional details that are received from the user and are traversed within the network of smartdust sensors.

FIG. 1 illustrates an example of an overview of devices and systems for executing an online transaction according to some examples of the present disclosure.

An online transaction 100 may generally involve a network 102 for security verification, an interface 104 for interacting with an end customer 106, i.e., the user. Ideally, the online transaction 100 should be safe and secure. However, there may be a potential hacker or eavesdropper 108 attempting to commit fraud, which causes significant loss to banks and end customers as well every year.

In some examples, the network 102 may include a blockchain network 110, a network 112 of smartdust sensors, a bank network 114, such as a private network associated with a financial institution, for enhanced security.

The blockchain network 110 generally enables transactions to be recorded in a decentralized network, which reduces the risk of fraud and cyber-attacks. In some examples, validation nodes filled with falsified transactional values may be created all over the blockchain network 110, which may make a hacker or an eavesdropper 108 believe that they are extracting real transactional information while committing fraud. In this way, a hacker or an eavesdropper 108 is prevented from reaching the real transactional information. Further, detected transactions made by a hacker or an eavesdropper 108 are not recorded so that only user's authentic online transactional behavior is kept for future verification. For example, each of the user's authentic online transactional behavior may be added as a new block to the blockchain network 110.

The network 112 of smartdust sensors is generally a network of multiple sensors based on a nanoelectromechanical system (NEMS). Each sensor may become a node of the network 112, and may be able to detect and relay data or information from its environment. For example, the data or information from each node's environment may be data or information of an ongoing transaction related to a debit card or a credit card. The data or information may include a card number, a card verification value (CVV), a user and a name of the user of the debit or credit card, a date and time of a transaction, a location of the transaction, an internet protocol (IP) address of a device used by the user 106, an amount of the transaction, a frequency of the user's recent transactions, a voltage of computation power that is utilized by the user for entering transactional information, and/or an electrical current and power consumption utilized by the user for entering the transactional information. Additionally and/or alternatively, the data or information may include other particulars.

The bank network 114 may independently provide historical data of the user's past transactions that is stored on its server. With the historical data and the ongoing transactional data, authenticity of the ongoing transaction may be determined.

Based on the determined authenticity of the ongoing transaction, an association page may be loaded to the interface 104, via which information may be exchanged with humans. A user, for example, the user 106 is then able to enter verification information to finalize and complete the ongoing transaction. The verification information may be an OTP. Additionally and/or alternatively, other verification information may also be used.

As such, an online transaction is safeguarded from possible fraud attempted by a hacker or an eavesdropper 108. At the same time, the blockchain network 110 may store authentic transactional behavior of the user 106 to its record.

Figure 2:
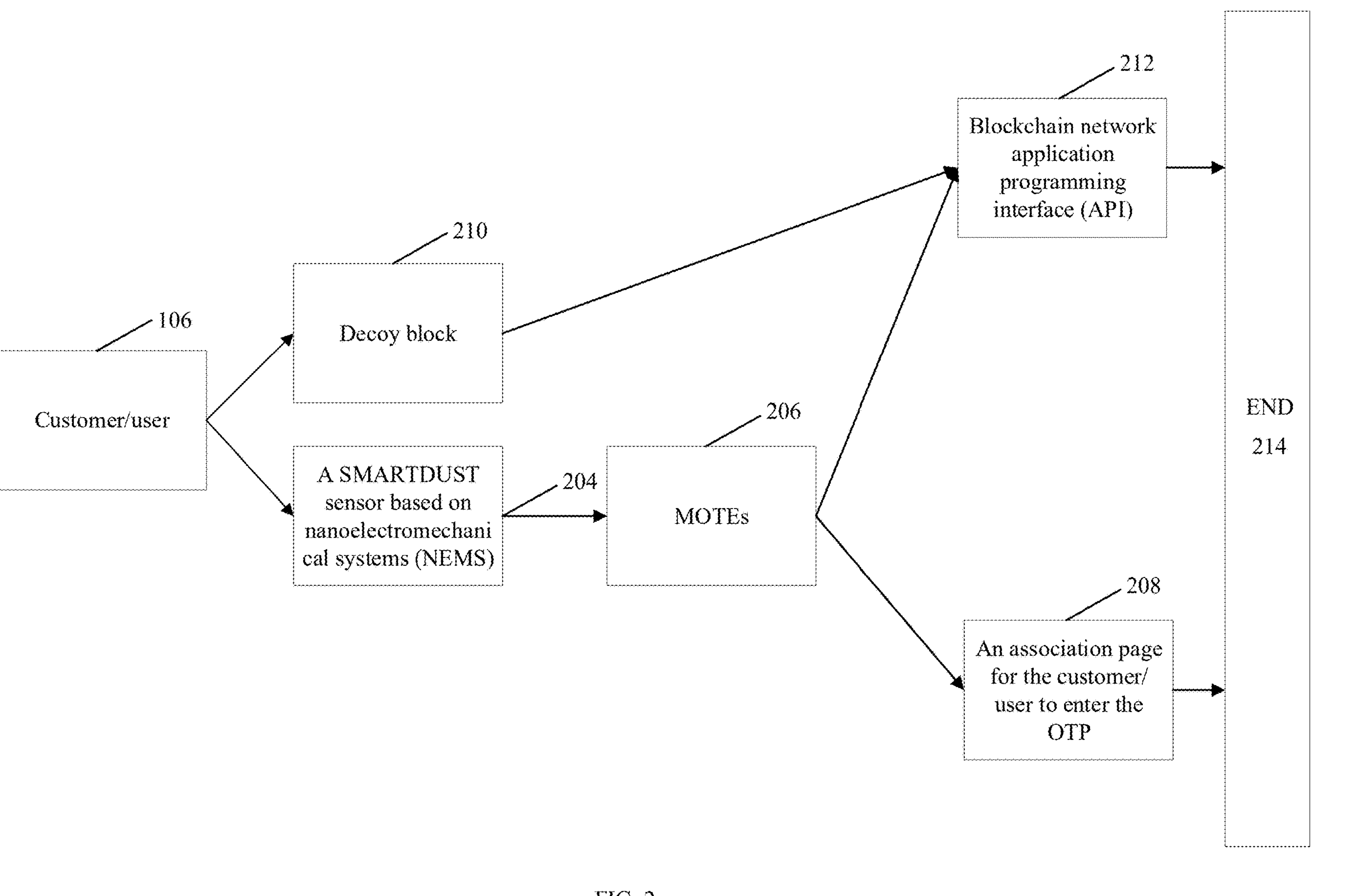
FIG. 2 illustrates a schematic block diagram for a secure online transaction according to some examples of the present disclosure.

FIG. 2 illustrates a schematic block diagram for a secure online transaction according to some examples of the present disclosure.

The transactional details entered by the user 106 may simultaneously or near-simultaneously be delivered to a smartdust sensor 204 of the smartdust sensor network 112 and the blockchain network 110.

The smartdust sensor 204 may be based on nanoelectromechanical system (NEMS). Additionally and/or alternatively, the smartdust sensor 204 may also be based on other technologies. The smartdust sensor 204 may communicate with other smartdust sensors of the network 112, and accordingly, user's transactional details may be traversed or distributed over the network 112. In some examples, one or more MOTEs 206 are created for verifying each of the user's transactional details. The number of MOTEs 206 may be any desired number of MOTEs. In one particular examples, four MOTEs may be used. However, different numbers of MOTEs may be used without departing from the invention. If the one or more MOTEs 206 verify that the user's transactional details are authentic, a consensus may be outputted to an application programming interface (API) 212 of the blockchain network 110, and also, to a computing platform to instruct the computing platform to load an association page 208 to the user 106.

At the same time, a decoy block 210 may be generated within blocks of the blockchain network 110. The decoy block 210 may mimic the user's transactional details. In general, the decoy block 210 may look and/or function like a real block, within the blocks of the blockchain network 110 so that it is able to confuse a hacker or an eavesdropper 108.

In some examples, the blockchain network 110, including the decoy block 210, may be visible to a potential hacker or eavesdropper 108 while the network 112 of smartdust sensors may be invisible. As such, the decoy block 210 may be able to confuse a hacker or an eavesdropper 108 with falsified user's transactional details, and at the same time, the hacker or eavesdropper 108 might be prevented from accessing the user's real transactional details traversed over the network 112 of smartdust sensors. Additionally and/or alternatively, other arrangements for the network's visibility may also be made.

In some examples, the decoy block 210 may be transmitted to the API 212 of the blockchain network 110. With the consensus received from the one or more MOTEs 206 of the smartdust sensor network 112, the API 212 may delete the decoy block 210 from the blockchain network 110. Additionally and/or alternatively, the API 212 may also delete any transactional records that a hacker or an eavesdropper 108 attempts to make. Accordingly, the blockchain network 110 may only retain user's authentic transactional behavior for future verification.

Once the user 106 enters a verification code via the association page 208, an online transaction is completed, i.e., the whole process ends at 214 as shown in FIG. 2.

Figure 3:
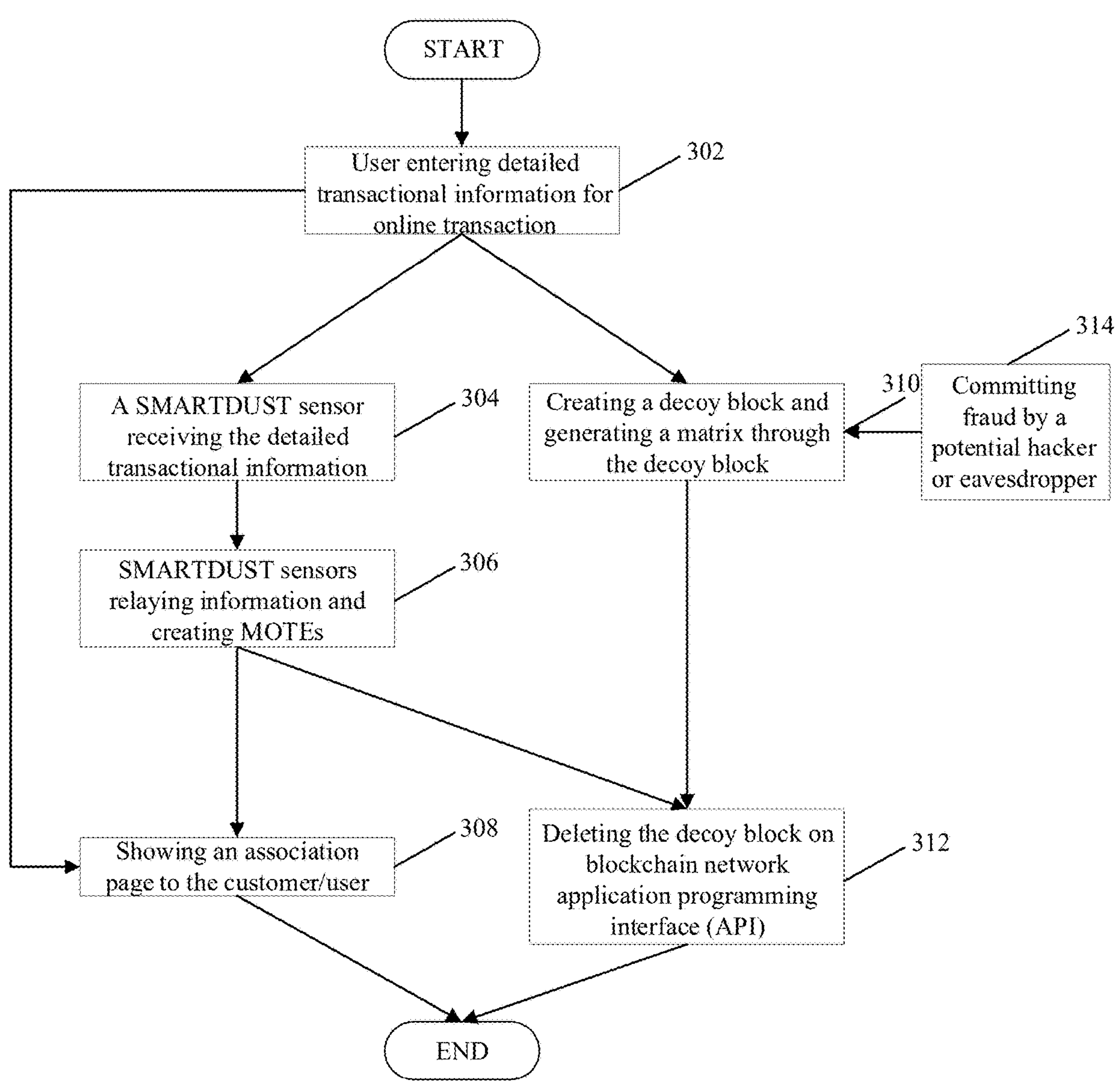
FIG. 3 illustrates a schematic flowchart of a method for a secure online transaction according to some examples of the present disclosure.

FIG. 3 illustrates a schematic flowchart of a method for a secure online transaction according to some examples of the present disclosure.

As shown in FIG. 3, steps for completing an online transaction according to some examples of the present disclosure may include:

At step 302, a user 106 may enter detailed transactional information for an online transaction.

At step 304, a smartdust sensor may receive the detailed transactional information. In some examples, the smartdust sensor may be the sensor 204 of the network 112 of smartdust sensors described with reference to FIG. 2.

At step 306, smartdust sensors within the network 112, including the smartdust sensor 204, may communicate with each other and relay the detailed transactional information among themselves. Accordingly, one or more validation nodes, also known as MOTEs 206 as described with reference to FIG. 2, may be created.

At the same time, or at nearly the same time, when steps 304 and 306 are conducted, at step 310, a decoy block, such as the decoy block 210 within the blockchain network 110 as shown in FIG. 2, is may be. The decoy block 210 may imitate the detailed transactional information, and further, generate a matrix of falsified validation nodes within the blockchain network 110.

In some examples, the decoy block 210 may be transmitted to an API of the blockchain network 110, such as the API 212 as shown in FIG. 2.

In some examples, given the visibility of the blockchain network 110, the matrix confuses a potential hacker or eavesdropper 108 as described according to FIG. 1. At step 314, a hacker or an eavesdropper 108 may believe that they have gained an access to real transactional information while attempting to commit fraud. In the end, what they are really accessing is falsified transactional information.

In some examples, any activities committed by the hacker or the eavesdropper 108 may be transmitted to the API 212 of the blockchain network 110.

Referring back to step 306, the one or more MOTEs 206 within the network 112 of smartdust sensors may verify the detailed transactional information and output a consensus if the detailed transactional information is verified true.

At step 308, an association page based on this consensus may be provided to the user 106 as described with respect to FIG. 1. For instance, the association page may be displayed via a display of a computing device associated with user 106. Via this association page, the user 106 may be able to enter a verification code (e.g., provide user input to the computing device associated with the user via one or more input devices). The verification code may be an OTP. Additionally and/or alternatively, the verification code may be other types of validation codes, authentication information, or the like.

At step 312, this consensus is also outputted to the API 212 of the blockchain network 110. Accordingly, the API 212 deletes the decoy block 210 from the blockchain network 110. Further, the API 212 does not record the activities committed by the hacker or the eavesdropper 108. As such, the API 212 may only maintain the records of user's real transactional behavior for the blockchain network 110.

In some examples, steps 308 and 312 may be conducted simultaneously or near-simultaneously. The process for a secure online transaction ends after steps 308 and 312 are completed.

Figure 4:
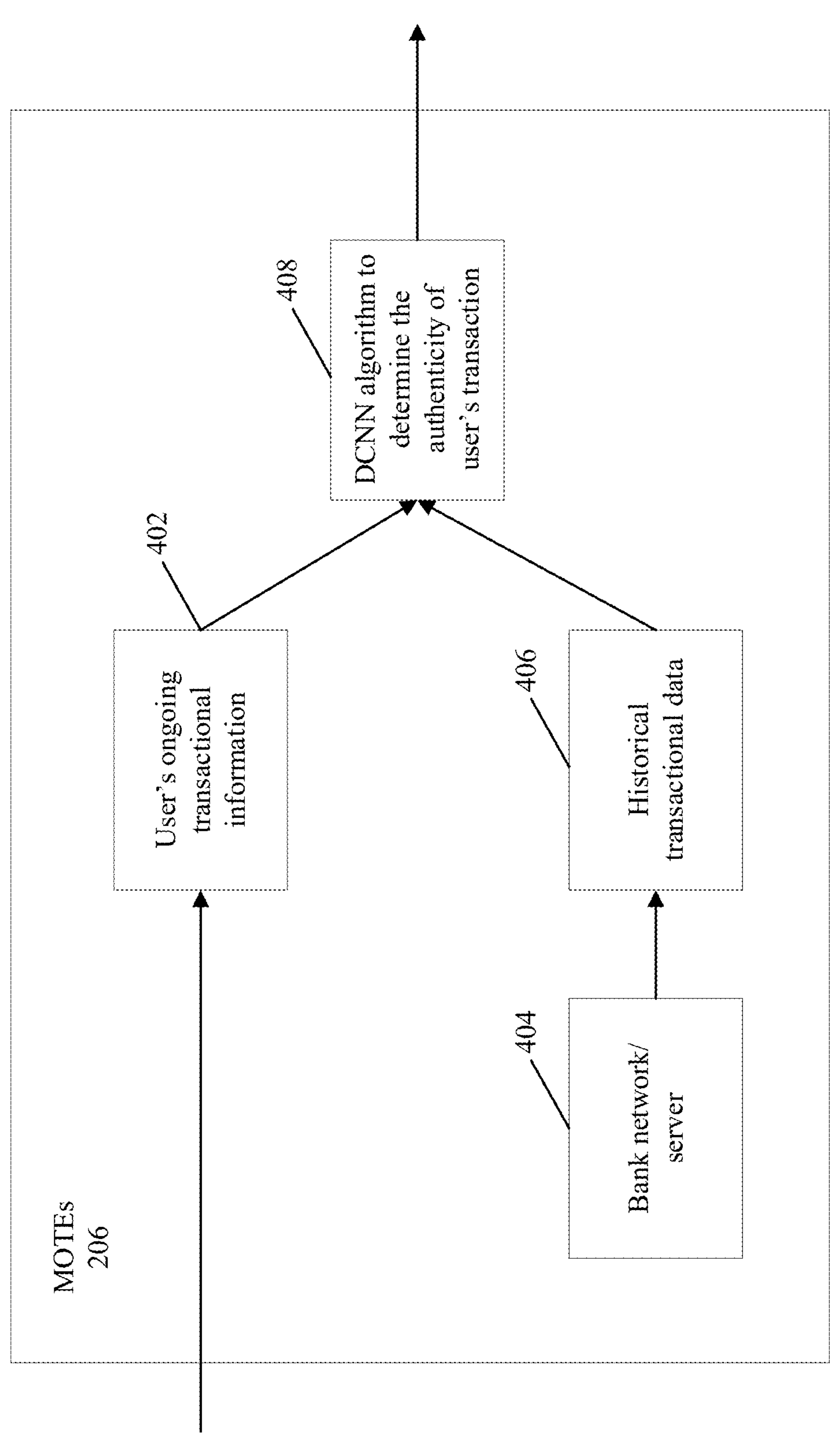
FIG. 4 illustrates another schematic block diagram for a secure online transaction according to some examples of the present disclosure.

FIG. 4 illustrates another schematic block diagram for a secure online transaction according to some examples of the present disclosure.

In FIG. 4, details of the one or more MOTEs 206 within the network 112 of smartdust sensors as shown in FIG. 2 are described.

The one or more MOTEs 206 may be generated based on the detailed transactional information 402 received from the user 106 for validating the transactional information. Generally, the number of the MOTEs 206 should be minimized in order to maintain efficiency of the process. A minimal number of the MOTEs 206 may also help maintain the invisibility of the network 112 of smartdust sensors so that a hacker or an eavesdropper 108 is not able to access user's real transactional information relayed within the network 112.

In some examples, four MOTEs 206 are generated to validate the detailed transactional information 402, which may include: user's debit card or credit card number; user's name; CVV; date and time of a transaction; a location of the transaction; an IP address of a device that is used by the user for making the transaction; an amount involved for the transaction.

In some examples, the detailed transactional information 402 may also include a frequency of transactions made by the user. The frequency may show or indicate a pattern of the user using their debit/credit card. For example, the user may use their debit/credit card every day, every other day, or once a week. If the user has not used their debit/credit card for, for example, more than three months, the related information may become historical data, which will be introduced below.

In some examples, the detailed transactional information 402 may also include voltage of computation power that is utilized by a device or a computer, through which the user enters the information for completing an online transaction.

In some examples, the detailed transactional information 402 may also include electrical current and power consumption that are utilized by a user's device or a computer while they are making an online transaction.

Additionally and/or alternatively, the detailed transactional information 402 may also include other types of particulars.

Additionally and/or alternatively, one, two, three, or more than four MOTEs 206 may be generated and serve as validation nodes within the network 112 of smartdust sensors.

As shown in FIG. 4, in each of the one or more MOTEs 206, one or more of the above listed detailed transactional information 402 may be validated. For example, a first MOTE 206 may validate detailed transactional information 402 such as debit card or credit card number, user's name, and CVV. For example, a second MOTE 206 may validate detailed transactional information 402 such as date/time of a transaction and location of the transaction. A third or a fourth MOTE 206 may validate other pieces of the detailed transactional information 402. Additionally and/or alternatively, other arrangements may also be made among the one or more MOTEs 206.

In some examples, a bank network 404 or a bank server 404 may provide historical data 406 regarding the user's transactional behavior to the one or more MOTEs 206. For example, the user's transactional behavior may include how often the user uses their debit/credit card in the past three months. Additionally and/or alternatively, the user's transactional behavior may also include other types of information. With this historical data 406, each MOTE 206 may validate whether one or more pieces of the detailed transactional information 402 are authentic.

In some examples, each MOTE 206 may infuse the historical data 406 and one or more pieces of the detailed transactional information 402 with some neural networks to process the data/information. For example, a deep convolutional neural network (DCNN) 408 may be used to process the historical data 406 and the one or more pieces of the detailed transactional information 402. Additionally and/or alternatively, other neural networks or a combination of one or more neural networks may be used to process the data.

Once all of the four MOTEs 206 complete validating the detailed transactional information 402, respectively, authenticity of the detailed transactional information 402 may be determined. For example, the network 112 of smartdust sensors may collect feedback from each of the four MOTEs 206, and then may output a consensus to the API 212 of the blockchain network 110 and to a computing platform for loading an association page 208 to the user 106 as shown in FIG. 2.

Figure 5:
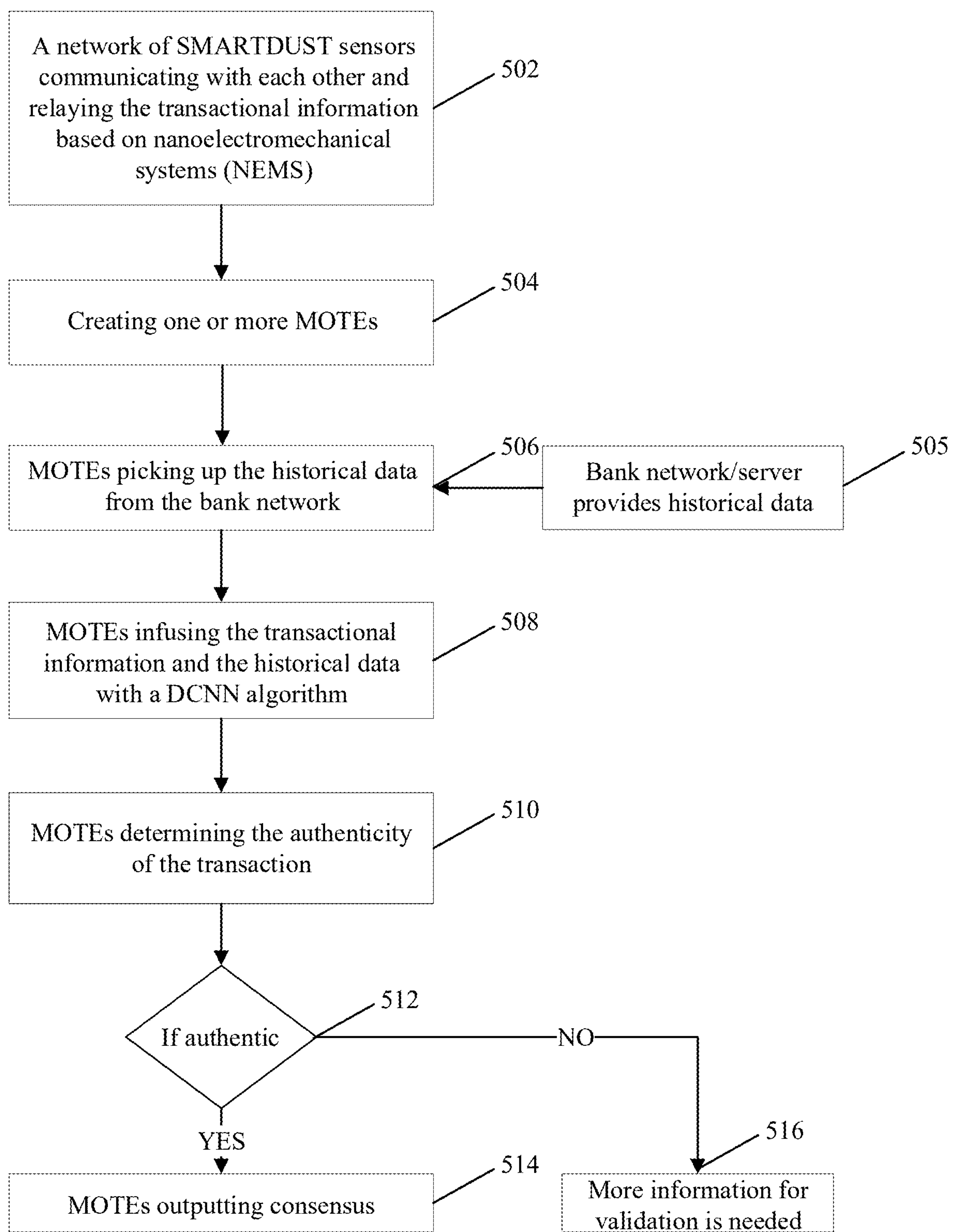
FIG. 5 illustrates another schematic flowchart of a method for a secure online transaction according to some examples of the present disclosure.

FIG. 5 illustrates another schematic flowchart of a method for a secure online transaction according to some examples of the present disclosure.

As shown in FIG. 5, within the network 112 of smartdust sensors, steps for processing the user's transactional information received by one of the smartdust sensors, for example, the smartdust sensor 204 as shown in FIG. 2, may include:

At step 502, the smartdust sensor 204 may communicate with the rest of the smartdust sensors within the network 112. In general, the smartdust sensors within the network 112 communicate with each other. In this way, the user's transactional information is relayed within the entire network 112.

At step 504, the network 112 of smartdust sensors may create one or more MOTEs, for example, MOTEs 206 as shown in FIG. 2.

In general, the MOTEs 206 may be validation nodes that may be able to sense information from their environment, i.e., the user's transactional information that is relayed all over the network 112 of smartdust sensors.

At step 505, a bank network or a bank server, such as the bank network 404 as shown in FIG. 4, may provide user's historical transactional data to the network 112.

At step 506, the one or more MOTEs 206 may collect the user's historical transactional data, respectively.

At step 508, the one or more MOTEs 206 may infuse the transactional information and the historical data with a DCNN to process the information/data.

In some examples, each MOTE 206 may validate one or more pieces of the transactional information. Accordingly, each MOTE 206 may infuse one or more pieces of the transactional information and the historical data with a DCNN to process the information/data, respectively.

At step 510, the one or more MOTEs 206 may determine the authenticity of the transactional information.

In some examples, each MOTE 206 may determine authenticity of the respective transactional information with the assistance of the DCNN.

At step 512, the network 112 of smartdust sensors may determine the authenticity of the user's transactional information based on a collection of each MOTE's determination.

At step 514, if the network 112 of smartdust sensors determines that the detailed transactional information is authentic, the network 112 may output a consensus.

In some examples, the consensus may be outputted to the API 212 of the blockchain network 110, as described in the following with reference to FIG. 7.

In some examples, the consensus may serve as a greenlight for loading an association page 208 to the user 106. The user 106 may then enter a verification code via the association page 208 to complete the online transaction securely.

At step 516, if the network 112 of smartdust sensors determines that the detailed transactional information is not authentic, more information may be required from the user 106 in order to complete the validation (e.g., additional authentication data, or the like).

Figure 6:
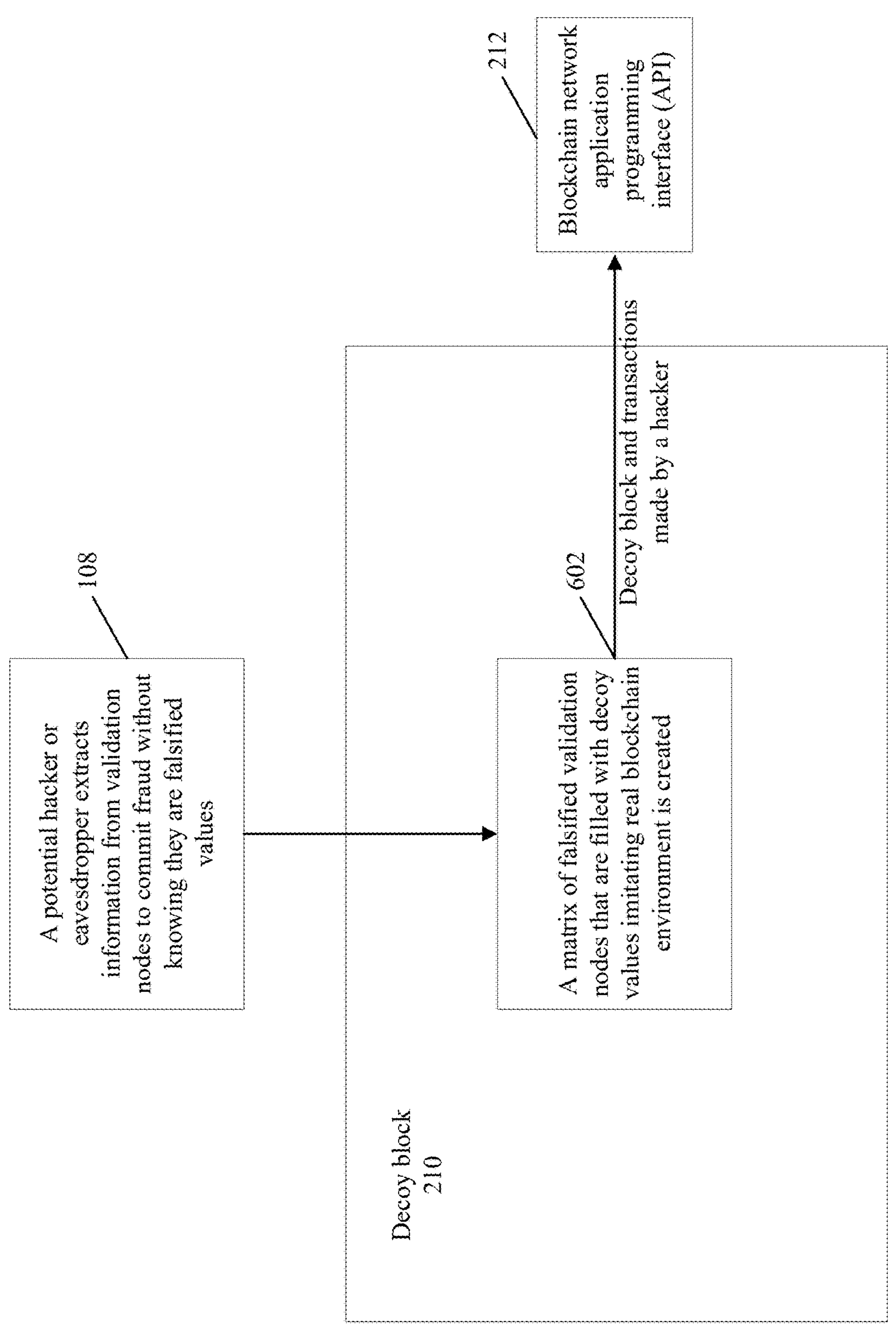
FIG. 6 illustrates another schematic block diagram for a secure online transaction according to some examples of the present disclosure.

FIG. 6 illustrates another schematic block diagram for a secure online transaction according to some examples of the present disclosure.

In FIG. 6, details of the decoy block 210 within the blockchain network 110 as shown in FIG. 2 are described.

In some examples, the decoy block 210 may create or generate a matrix 602 with its decoy values. In general, the matrix 602 may be a matrix of falsified validation nodes. Each of the falsified validation nodes may be filled or populated with decoy values. In some examples, the decoy values may imitate the user's transactional information. The decoy values may also imitate a real blockchain environment of the blockchain network 110. The decoy values may also imitate a combination of the user's transactional information and the real blockchain environment.

When a hacker or an eavesdropper 108 attempts to commit fraud, they are only able to see the blockchain network 110. With the matrix 602 within the blockchain network 110, the hacker or eavesdropper 108 is misled to believe that the matrix 602 contains user's real transactional information. In fact, the information includes decoy values. As such, a hacker's access to the information would not cause loss of user's credentials, and an unauthorized use of user's debit or credit card is prevented before it succeeds.

In some examples, the decoy block 210 may be transmitted to an API of the blockchain network 110, such as the API 212 as shown in FIG. 2. Any recorded activities by the hacker or eavesdropper 108 may also be transmitted to the API 212.

Figure 7:
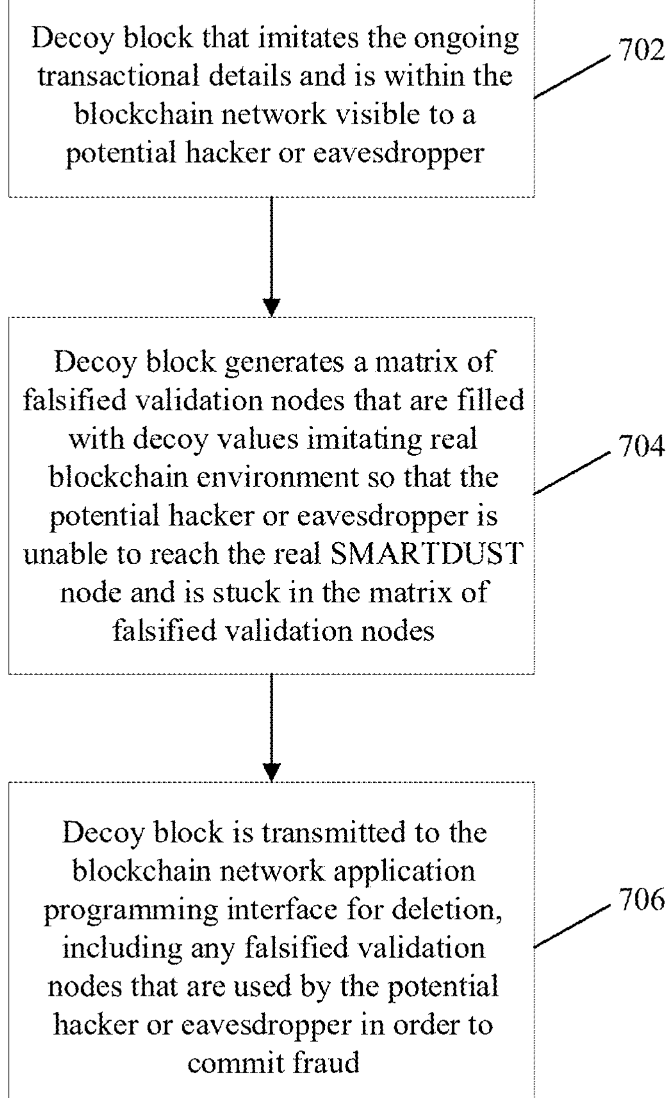
FIG. 7 illustrates another schematic flowchart of a method for a secure online transaction according to some examples of the present disclosure.

FIG. 7 illustrates another schematic flowchart of a method for a secure online transaction according to some examples of the present disclosure.

The process conducted within the blockchain network 110 may include:

At step 702, a decoy block 210 may be created based on the transactional information received from the user 106.

In some examples, the decoy block 210 may mimic the user's ongoing transactional details and may be located within a series of blocks of the blockchain network 110. The decoy block 210 may serve as a decoy transactional block in a blockchain environment of the blockchain network 110. In general, the blockchain network 110 may be visible to a potential hacker or eavesdropper 108. Accordingly, the decoy block 210 may also be visible to the potential hacker or eavesdropper 108, and thus, is able to confuse them with respect to user's data.

At step 704, the decoy block 210 may generate a matrix 602 of falsified validation nodes. These falsified validation nodes are generally decoy values which imitate the user's ongoing transactional details. Additionally and/or alternatively, the decoy values may also imitate a real blockchain environment of the blockchain network 110.

On one hand, a hacker or an eavesdropper 108 may be able to access the blockchain network 110 and become enmeshed in the matrix 602 of falsified validation nodes. On the other hand, the hacker or eavesdropper 108 might not be able to access the network 112 of smartdust sensors, where the user's real transactional information is traversed. As such, the user's credentials are safe guarded, and a secure online transaction can be achieved.

At step 706, the decoy block 210 may be transmitted to the API 212 of the blockchain network 110.

In some examples, any falsified validation nodes that are accessed by the hacker or eavesdropper 108 may also be transmitted to the API 212. Based on further instructions, for example, a consensus given by the network 112 of smartdust sensors described with reference to FIG. 5, the API 212 may delete the decoy block 210 and the accessed falsified validation nodes from the blockchain network 110. As such, the blockchain network 110 may maintains only the user's real transactional behavior for future validation.

Figure 8:
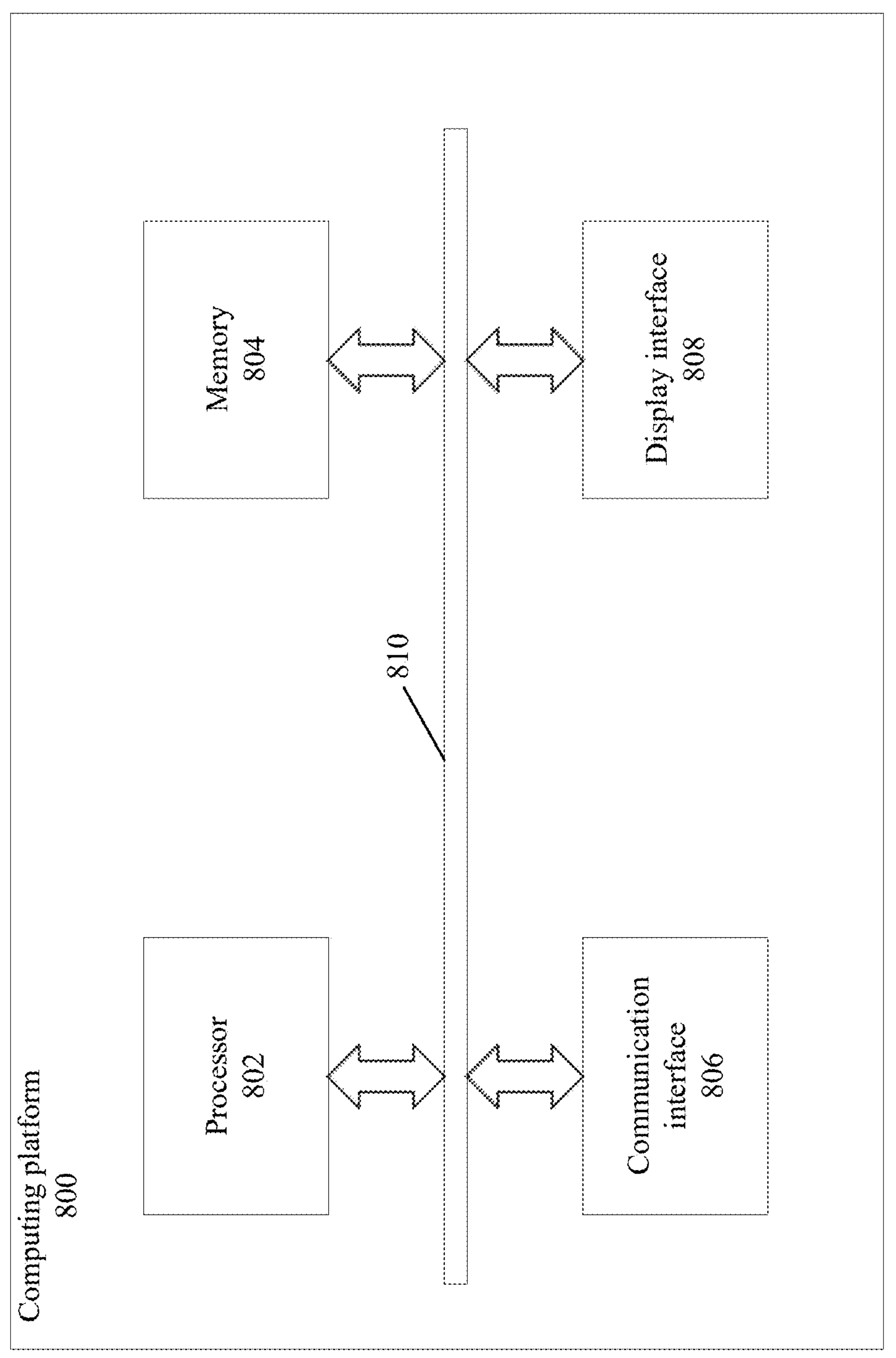
FIG. 8 illustrates a schematic diagram of a computing platform for a secure online transaction according to some examples of the present disclosure.

FIG. 8 illustrates a schematic diagram of a computing platform for a secure online transaction according to some examples of the present disclosure.

As shown, the computing platform 800 may include a processor 802, memory 804, and a communication interface 806. The computing platform 800 may include a bus 810, through which the processor 802, the memory 804, the communication interface 806, and other components of the computing platform 800 exchange information with each other.

The computing platform 800 may include a display interface 808. For example, the display interface 808 may display the association page 208 to the user 106 as shown at step 308 of FIG. 3. For example, the display interface 808 may display a validation failure and a request for more information to the user 106 as shown at step 516 of FIG. 5. Additionally and/or alternatively, the display interface 808 may show other types of information. Additionally and/or alternatively, the display interface 808 may be independent from the computing platform 800 (e.g., part of a user computing device).

The processor 802 may include one or more general-purpose processors, such as a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 804 may include volatile memory, for example, random-access memory (RAM). The memory 804 may further include non-volatile memory (NVM), for example, read-only memory (ROM), flash memory, hard disk drive (HDD), or solid-state drive (SSD). The memory 804 may further include a combination of the foregoing types.

The memory 804 may have computer-readable program codes stored thereon. The processor 802 may read the computer-readable program codes stored on the memory 804 to perform the methods described according to FIGS. 3, 5, and 7 for processing a secure online transaction. Additionally and/or alternatively, the processor 802 may read the computer-readable program codes stored on the memory 804 to perform one or more other functions, or a combination of these functions.

The processor 802 may further communicate with another computing device through the communication interface 806. For example, the processor 802 may further communicate with external physical memory or external memory on a cloud to obtain necessary data and/or computing algorithms for further data analysis. For example, the processor 802 may communicate with an external neural network, such as a DCNN or other types of neural network, to process the data in order to validate an ongoing online transaction. For example, the processor 802 may communicate with a bank network/server to obtain data regarding user's historical transactional behavior to validate the ongoing online transaction.

The processor 802 may also trigger the display interface 808 to display the information to the user as described above.

A person of ordinary skill in the art will appreciate that the computing platform 800 as shown in FIG. 8 may communicate with one or more further computing devices through the communication interface 806 or wireless connections for further functions, or a combination of functions. Further, the computing platform 800 as shown in FIG. 8 may also include one or more further functional components to perform and/or trigger further functions, or a combination of functions.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method for a secure online transaction, comprising:

receiving, by a computing platform having one or more processors, memory and a communication interface, transactional information from a user, wherein the transactional information is associated with an ongoing transaction;

receiving, by a first sensor of a plurality of sensors in a sensor network, the transactional information, wherein the plurality of sensors includes a plurality of nanoelectromechanical system sensors;

distributing, by the one or more processors and from the first sensor, the transactional information over the sensor network to additional sensors of the plurality of sensors;

generating, by the one or more processors, a decoy transactional block that imitates the transactional information within a blockchain network of the computing platform, wherein the decoy transactional block is visible to an unauthorized user and the plurality of sensors are not visible to the unauthorized user; and displaying, by the one or more processors, an association page for the user to enter a verification code, and deleting, by the one or more processors, the decoy transactional block from the blockchain network based on determining that the transactional information is authentic.

2. The method of claim 1, wherein the distributing, by the one or more processors and from the first sensor, the transactional information over the sensor network further includes:

initiating, by the one or more processors, a communication among the first sensor and the additional sensors of the plurality of sensors in the sensor network.

3. The method of claim 2, wherein the transactional information comprises at least one of:

a credit card or a debit card of the user;

a card verification value (CVV) for the credit card or the debit card;

a name of the user;

a date and time of a transaction;

a location of the transaction;

an internet protocol (IP) address of a device used by the user for the transaction;

an amount of the transaction;

a frequency of use of the credit card or the debit card;

a voltage of computation power that is utilized by the device for the user to enter the transactional information; and a current and power consumption that is utilized by the device for the user to enter the transactional information.

4. The method of claim 1, wherein the determining that the transactional information is authentic comprises:

obtaining, by the one or more processors, historical transactional data of the user from a bank network that matches the transactional information; and infusing, by the one or more processors, the transactional information and the historical transactional data of the user with an algorithm to determine whether the transactional information is authentic.

5. The method of claim 4, wherein the algorithm is a deep convolutional neural network (DCNN) algorithm.

6. The method of claim 1, wherein the generating, by the one or more processors, the decoy transactional block that imitates the transactional information within the blockchain network of the computing platform comprises:

generating, by the one or more processors, a matrix of validation nodes within the blockchain network of the computing platform that are filled with decoy transactional values.

7. A computing platform, comprising:

a plurality of sensors in a sensor network;

at least one processor;

a communication interface communicatively coupled to the at least one processor; and memory storing computer-readable instructions that, when executed by the at least one processor, cause the at least one processor to:

receive transactional information from a user, wherein the transactional information is associated with an ongoing transaction;

wherein a first sensor of the plurality of sensors in the sensor network is configured to:

receive the transactional information, wherein the plurality of sensors includes a plurality of nanoelectromechanical system sensors;

distribute the transactional information over the sensor network to additional sensors of the plurality of sensors;

wherein the computer-readable instructions that, when executed by the at least one processor, cause the at least one processor to further perform:

generate a decoy transactional block that imitates the transactional information within a blockchain network of the computing platform, wherein the decoy transactional block is visible to an unauthorized user and the plurality of sensors are not visible to the unauthorized user; and display an association page for the user to enter a verification code and delete the decoy transactional block from the blockchain network based on determining that the transactional information is authentic.

8. The computing platform of claim 7, wherein the computer-readable instructions that, when executed by the at least one processor, further cause the at least one processor to:

initiate a communication among the first sensor and the additional sensors of the plurality of sensors in the sensor network.

9. The computing platform of claim 8, wherein the transactional information comprises at least one of:

a credit card or a debit card of the user;

a card verification value (CVV) for the credit card or the debit card;

a name of the user;

a date and time of a transaction;

a location of the transaction;

an internet protocol (IP) address of a device used by the user for the transaction;

an amount of the transaction;

a frequency of use of the credit card or the debit card;

a voltage of computation power that is utilized by the device for the user to enter the transactional information; and a current and power consumption that is utilized by the device for the user to enter the transactional information.

10. The computing platform of claim 7, wherein the computer-readable instructions that, when executed by the at least one processor, further cause the at least one processor to:

obtain historical transactional data of the user from a bank network that matches the transactional information; and infuse the transactional information and the historical transactional data of the user with an algorithm to determine whether the transactional information is authentic.

11. The computing platform of claim 10, wherein the algorithm is a deep convolutional neural network (DCNN) algorithm.

12. The computing platform of claim 7, wherein the computer-readable instructions that, when executed by the at least one processor, further cause the at least one processor to:

generate a matrix of validation nodes within the blockchain network of the computing platform that are filled with decoy transactional values.

13. A non-transitory computer-readable medium, having computer-executable instructions stored thereon, the computer-executable instructions, when executed by one or more processors of a computing platform, cause the one or more processors to facilitate:

receiving transactional information from a user, wherein the transactional information is associated with an ongoing transaction, wherein the computing platform further comprises a plurality of sensors in a sensor network;

receiving, via a first sensor of the plurality of sensors, the transactional information, wherein the plurality of sensors includes a plurality of nanoelectromechanical system sensors;

distributing, via the first sensor, the transactional information over the sensor to additional sensors of the plurality of sensors;

generating a decoy transactional block that imitates the transactional information within a blockchain network of the computing platform, wherein the decoy transactional block is visible to an unauthorized user and the plurality of sensors are not visible to the unauthorized user; and displaying an association page for the user to enter a verification code and deleting the decoy transactional block from the blockchain network based on determining that the transactional information is authentic.

14. The non-transitory computer-readable medium of claim 13, wherein the computer-executable instructions that, when executed by the one or more processors, further cause the one or more processors to facilitate:

initiating a communication among the first sensor and the additional sensors of the plurality of sensors in the sensor network.

15. The non-transitory computer-readable medium of claim 13, wherein the computer-executable instructions that, when executed by the one or more processors, further cause the one or more processors to facilitate:

obtaining historical transactional data of the user from a bank network that matches the transactional information; and infusing the transactional information and the historical transactional data of the user with an algorithm to determine whether the transactional information is authentic.

16. The non-transitory computer-readable medium of claim 15, wherein the algorithm is a deep convolutional neural network (DCNN) algorithm.

17. The non-transitory computer-readable medium of claim 13, wherein the computer-executable instructions that, when executed by the one or more processors, further cause the one or more processors to facilitate:

generating a matrix of validation nodes within the blockchain network of the computing platform that are filled with decoy transactional values.

* * * * *